US008527970B1

(12) United States Patent
Luecke

(10) Patent No.: US 8,527,970 B1
(45) Date of Patent: Sep. 3, 2013

(54) METHODS AND SYSTEMS FOR MAPPING THREADS TO PROCESSOR CORES

(75) Inventor: Kenn R. Luecke, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 476 days.

(21) Appl. No.: 12/878,409

(22) Filed: Sep. 9, 2010

(51) Int. Cl.
*G06F 9/45* (2006.01)
(52) U.S. Cl.
USPC .............................. 717/140; 717/145; 717/149
(58) Field of Classification Search
None
See application file for complete search history.

(56) References Cited

U.S. PATENT DOCUMENTS

| | | | | |
|---|---|---|---|---|
| 5,745,778 A * | 4/1998 | Alfieri | | 712/1 |
| 6,195,676 B1 * | 2/2001 | Spix et al. | | 718/107 |
| 6,256,779 B1 * | 7/2001 | Martin | | 717/116 |
| 6,286,132 B1 * | 9/2001 | Tanaka et al. | | 717/125 |
| 6,611,276 B1 * | 8/2003 | Muratori et al. | | 715/772 |
| 7,020,871 B2 * | 3/2006 | Bernstein et al. | | 717/129 |
| 7,055,144 B2 * | 5/2006 | Aubertine | | 717/149 |
| 7,627,851 B2 * | 12/2009 | Lotter | | 717/106 |
| 7,788,650 B2 * | 8/2010 | Johnson et al. | | 717/140 |
| 7,844,952 B2 * | 11/2010 | Barsness et al. | | 717/125 |
| 8,136,097 B2 * | 3/2012 | Konishi et al. | | 717/129 |
| 8,201,157 B2 * | 6/2012 | Wagner et al. | | 717/145 |
| 8,336,023 B2 * | 12/2012 | Kuzsma et al. | | 717/105 |
| 2003/0014739 A1 * | 1/2003 | Aubertine | | 717/149 |
| 2005/0022173 A1 * | 1/2005 | Kanade | | 717/140 |
| 2005/0050522 A1 * | 3/2005 | Kami et al. | | 717/124 |
| 2006/0015856 A1 * | 1/2006 | Lotter | | 717/136 |
| 2006/0206881 A1 * | 9/2006 | Dodge et al. | | 717/140 |
| 2007/0061788 A1 * | 3/2007 | Dodge et al. | | 717/140 |
| 2007/0150867 A1 * | 6/2007 | Barsness et al. | | 717/124 |
| 2007/0150895 A1 * | 6/2007 | Kurland | | 718/102 |
| 2007/0294660 A1 * | 12/2007 | Chong et al. | | 717/103 |
| 2007/0294681 A1 * | 12/2007 | Tuck et al. | | 717/149 |
| 2009/0125877 A1 * | 5/2009 | Kuzsma et al. | | 717/105 |
| 2010/0107146 A1 * | 4/2010 | Wrighton et al. | | 717/134 |
| 2010/0299496 A1 * | 11/2010 | Arimilli et al. | | 712/32 |
| 2010/0325608 A1 * | 12/2010 | Radigan | | 717/106 |
| 2011/0066828 A1 * | 3/2011 | Wolfe et al. | | 712/220 |
| 2011/0131558 A1 * | 6/2011 | Young et al. | | 717/145 |
| 2011/0271263 A1 * | 11/2011 | Archer et al. | | 717/149 |

OTHER PUBLICATIONS

Robbins, "VS 2010 Beta 2 Concurrency Visualizer Profiling in Depth First Look", Oct. 23, 2009, pp. 1-13, downloaded from the Internet on Nov. 28, 2012 from <url>: http://www.wintellect.com/... bins/archive/2009/10/23/vs-2010-beta-2-concurrency-visualizer-profiling-in-depth-first-look.aspx.*

Markatos et al., "Using Processor Affinity in Loop Scheduling on Shared-Memory Multiprocessors", 1992, pp. 104-113.*

(Continued)

*Primary Examiner* — Thuy Dao
*Assistant Examiner* — Stephen Berman
(74) *Attorney, Agent, or Firm* — Armstrong Teasdale LLP

(57) ABSTRACT

Methods and apparatus for use in executing a software application by a plurality of processor cores. The software application is associated with source code that defines a plurality of threads. A portion of source code corresponding to each thread is identified, and each thread is assigned to a processor core. Each processor core is associated with the portions of source code that correspond to the threads assigned to the processor core. The portions of source code associated with each processor core are operable to be transformed into object code for execution by the processor core. The relationships between the processor cores, the threads, and/or the portions of source code may be displayed to a user.

19 Claims, 7 Drawing Sheets

(56) References Cited

OTHER PUBLICATIONS

Jones, "A Powerful IDE fro GPU Computing on Windows Codenamed 'Nexus'", Nov. 2009, pp. 1-10, downloaded from the Internet on Feb. 12, 2013 from <url>: http://www.nvidia.com/content/GTC/documents/SC09_Jones_Nexus.pdf.*

Becchi, "Dynamic Thread Assignment on Heterogeneous Multiprocessor Architectures", 2008, Journal of Instruction-Level Parallelism Oct. 2008 1-26.*

Linderman et al., "Merge: A Programming Model for Heterogeneous", ASPLOS'08, Mar. 1-5, 2008, Seattle, Washington, USA, pp. 287-296.*

Ryoo et al., "Optimization Principles and Application Performance Evaluation of a Multithreaded GPU Using CUDA", PPoPP '08, Feb. 20-23, 2008, Salt Lake City, Utah, USA, pp. 73-82.*

Suleman et al., "Feedback-Driven Threading: Power-Efficient and High-Performance Execution of Multi-threaded Workloads on CMPs", ASPLOS'08, Mar. 1-5, 2008, Seattle, Washington, USA, pp. 277-286.*

Bill Graham and Edwin Verplanke, More with Multi-core: Optimizing Intel Multi-core Embedded Platforms, Feb. 17, 2009, 56 pages QNX Software Systems.

* cited by examiner

METHODS AND SYSTEMS FOR MAPPING THREADS TO PROCESSOR CORES

BACKGROUND

The field of the disclosure relates generally to systems that manage software application source code, and more specifically, to methods and systems for associating threads of a software application with specific processor cores of a multi-core processor unit.

At least some known processor units include a plurality of processor cores. Such processor units are referred to as "multi-core" processor units and may include homogenous or heterogeneous processor cores. Further, when executing a software application that includes multiple threads, at least some known computer systems distribute the threads across the processor cores of a multi-core processor unit.

Such systems generally increase execution speed by enabling the threads to execute in parallel. However, known systems do not include a facility for conveniently identifying what source code is associated with a thread or the ability to assign threads to processor cores based on attributes of the threads, such as what resources the threads access, and/or attributes of the processor cores, such as processing speeds.

BRIEF DESCRIPTION

In one aspect, a method is provided for use in executing a software application by a processor unit that includes a plurality of processor cores. The method includes identifying, by a computer system, a plurality of threads within source code associated with the software application. A portion of the source code that corresponds to each thread of the plurality of threads is identified by the computer system. Each thread of the plurality of threads is assigned to a processor core of the plurality of processor cores. Each processor core is associated with the portions of the source code that correspond to the threads assigned to the processor core by the computer system. The portions of the source code associated with each processor core are operable to be transformed into object code for execution by the processor core.

In another aspect, a system is provided for use in executing a software application by a plurality of processor cores. The system includes a storage device that is configured to store source code associated with the software application. The source code defines a plurality of threads. The system also includes a processor unit that is coupled to the storage device and programmed to identify a portion of the source code corresponding to each thread of the plurality of threads. The processor is also programmed to assign each thread of the plurality of threads to one processor core of the plurality of processor cores and to associate each processor core of the plurality of processor cores with the portions of the source code that correspond to the threads assigned to the processor core. The portions of the source code associated with each processor core are operable to be transformed into object code for execution by the processor core.

The features, functions, and advantages that have been discussed can be achieved independently in various embodiments or may be combined in yet other embodiments further details of which can be seen with reference to the following description and drawings.

DETAILED DESCRIPTION

The described embodiments are directed to designating threads of a software application for execution by a plurality of processor cores. In an exemplary embodiment, source code corresponding to each thread is identified automatically by a computer system. Threads are assigned to processor cores, either by a human operator or by the computer system, and source code corresponding to each thread is associated with the processor core to which the thread is assigned.

As used herein, the term "source code" refers to human-readable statements that describe operations capable of being performed by a computer. Source code may be transformed into "object code" that includes computer-executable instructions. For example, source code may be compiled and/or translated to create object code. The computer-executable instructions of the application object code correspond to the human-readable statements of the application source code. Unlike human-readable statements, computer-executable instructions are executable directly by a processor unit of a computer.

Figure 1:
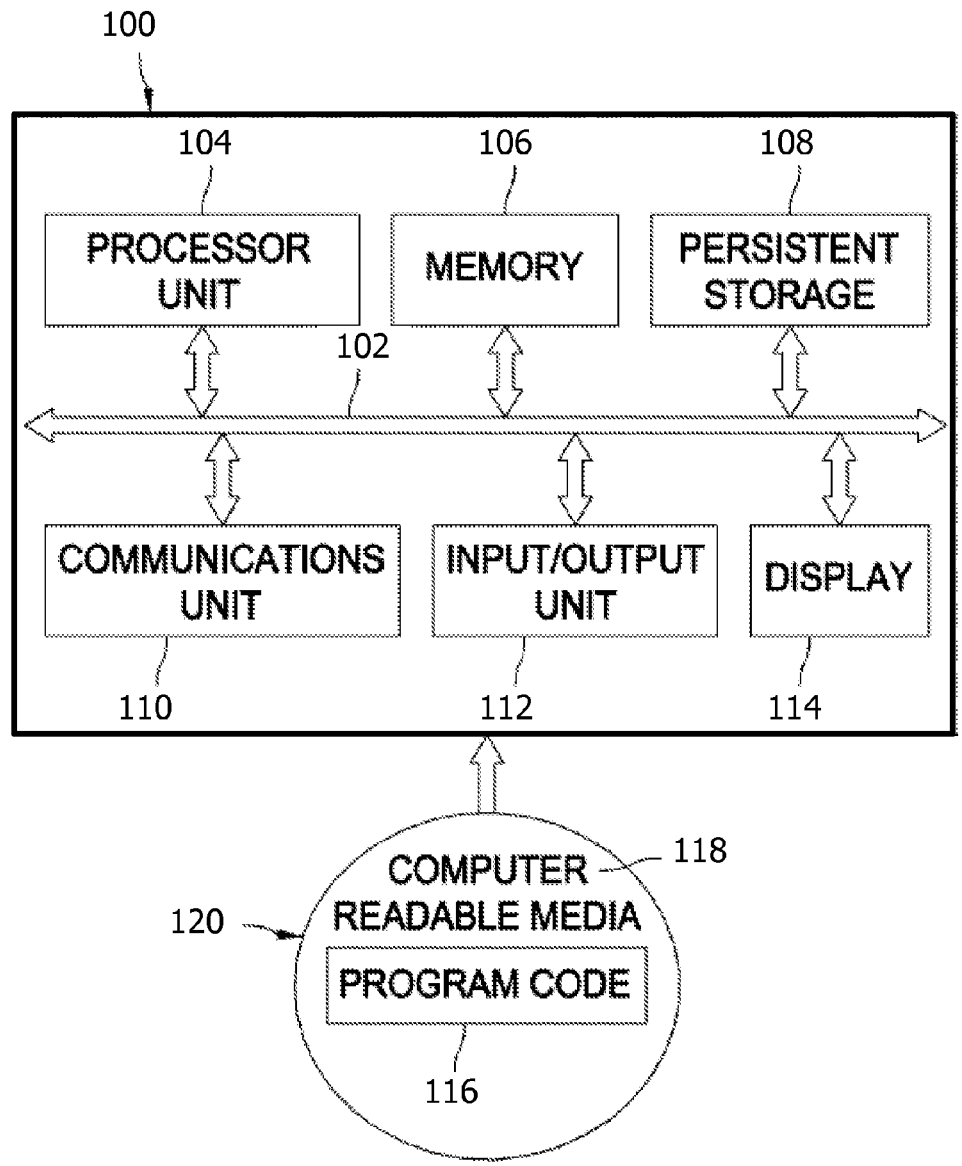
FIG. 1 is a block diagram of an exemplary computer system.

FIG. 1 is a block diagram of an exemplary computer system 100. Computer system 100 includes communications fabric 102, which provides communications between a processor unit 104, a memory 106, persistent storage 108, a communications unit 110, an input/output (I/O) unit 112, and a presentation interface, such as a display 114. In addition to, or alternative to, the presentation interface may include an audio device (not shown) and/or any device capable of conveying information to a user.

Processor unit 104 serves to execute instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. As another illustrative example, processor unit 104 may be a homogeneous processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, without limitation, a random access memory or any other suitable volatile or non-volatile storage device. Persistent storage 108 may take various forms depending on the particular implementation. For example, without limitation, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store source code, object code, attributes of processor cores (e.g., an instruction set architecture, a processing speed, and/or a cache size), and/or associations between processor cores, threads, and/or portions of source code.

Communications unit 110, in these examples, provides for communications with other computer systems or devices. In these examples, communications unit 110 is a network interface card. Communications unit 110 may provide communications through the use of either or both physical and wireless communication links.

Input/output unit 112 allows for input and output of data with other devices that may be connected to computer system 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computer system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computer system 100. The tangible form of computer readable media 118 is also referred to as computer recordable storage media. In some instances, computer readable media 118 may not be removable.

Alternatively, program code 116 may be transferred to computer system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or computer system for use within computer system 100. For instance, program code stored in a computer readable storage medium in a server computer system may be downloaded over a network from the server to computer system 100. The computer system providing program code 116 may be a server computer, a workstation, a client computer, or some other device capable of storing and transmitting program code 116.

Program code 116 may be organized into computer-executable components that are functionally related. For example, program code 116 may include a parsing component, a mapping component, a display component, and/or any component suitable for the methods described herein. Each component may include computer-executable instructions that, when executed by processor unit 104, cause processor unit 104 to perform one or more of the operations described herein.

The different components illustrated for computer system 100 are not meant to provide architectural limitations to the manner in which different embodiments may be implemented. The different illustrative embodiments may be implemented in a computer system including components in addition to or in place of those illustrated for computer system 100. Other components shown in FIG. 1 can be varied from the illustrative examples shown.

As one example, a storage device in computer system 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
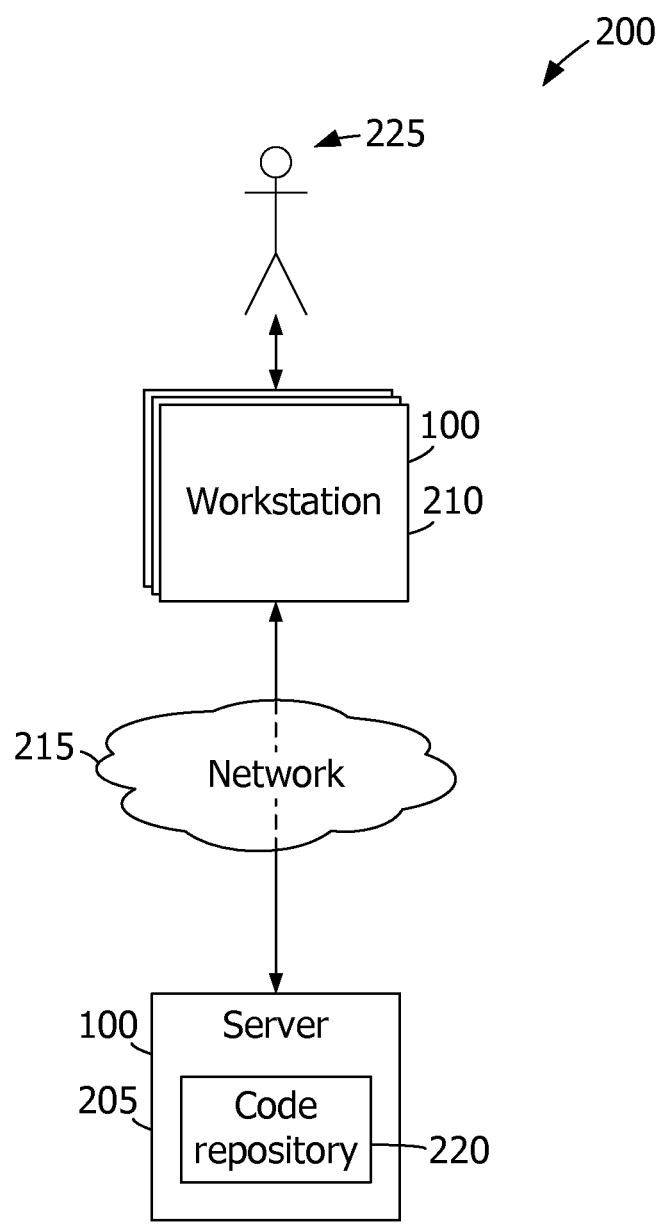
FIG. 2 is a block diagram illustrating an exemplary system for use in executing a software application by a plurality of processor cores.

FIG. 2 is a block diagram illustrating an exemplary system 200 for use in executing a software application by a plurality of processor cores. System 200 includes a server 205 and a workstation 210 coupled in communication via a network 215. Network 215 may include, without limitation, the Internet, a local area network (LAN), a wide area network (WAN), a wireless LAN (WLAN), a mesh network, and/or a virtual private network (VPN).

Server 205 and workstation 210 are separate examples of computer system 100 (shown in FIG. 1). In the exemplary embodiment, each computing device 100 is coupled to network 215 via communications unit 110. In an alternative embodiment, server 205 is integrated with workstation 210.

Server 205 includes a code repository 220, which may be stored in memory 106. Code repository 220 stores source code, object code, mapping information and/or any other data suitable for use with a software application. In one embodiment, code repository 220 includes revisions and/or updates of files (e.g., source code files) associated with the software application. For example, code repository 220 may include a history of changes made to a file.

Workstation 210 interacts with a user 225 (e.g., via user input/output unit 112 and/or display 114, shown in FIG. 1). User 225 may include, but is not limited to including, a software developer.

Server 205 interacts with one or more workstations 210. In an exemplary embodiment, server 205 transmits source code and/or object code from code repository 220 to workstation 210. User 225 accesses the source code and/or the object code at workstation 210. In one embodiment, user 225 modifies the source code, and server 205 receives updated source code from workstation 210. Code repository 220 stores the updated source code. For example, code repository 220 may store an updated file as a new version of the file and retain the prior version of the file. In some embodiments, a user 225 assigns threads to processor cores at workstation 210, which transmits the assignments to server 205. Server 205 receives the assignments from workstation 210 and stores the assignments in code repository 220.

In some embodiments, workstation 210 is remote to server 205. For example, workstation 210 may be located at a facility that is geographically removed from server 205.

Figure 3:
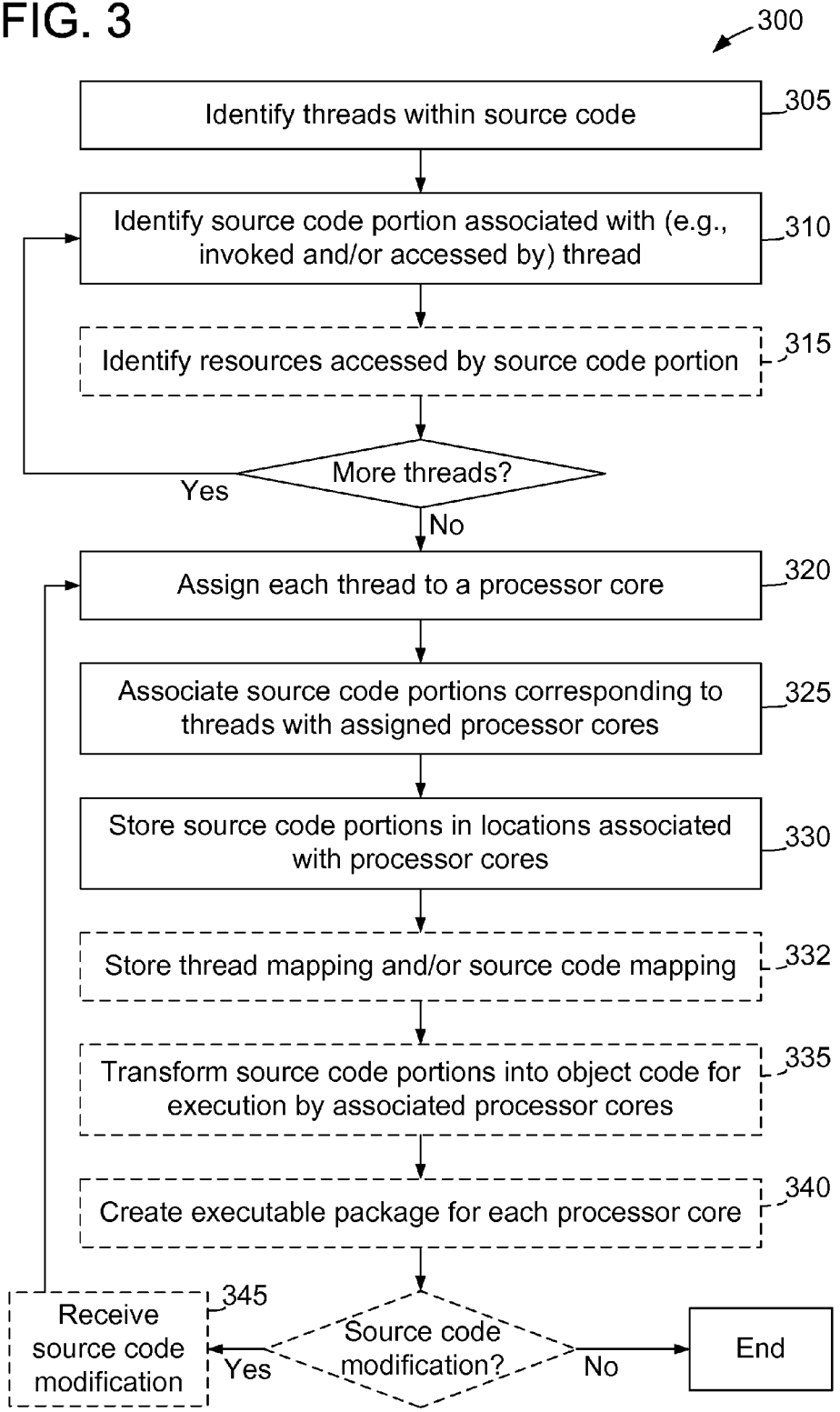
FIG. 3 is a flowchart of an exemplary method for use in executing a software application by a processor unit having a plurality of processor cores.
Figure 4:
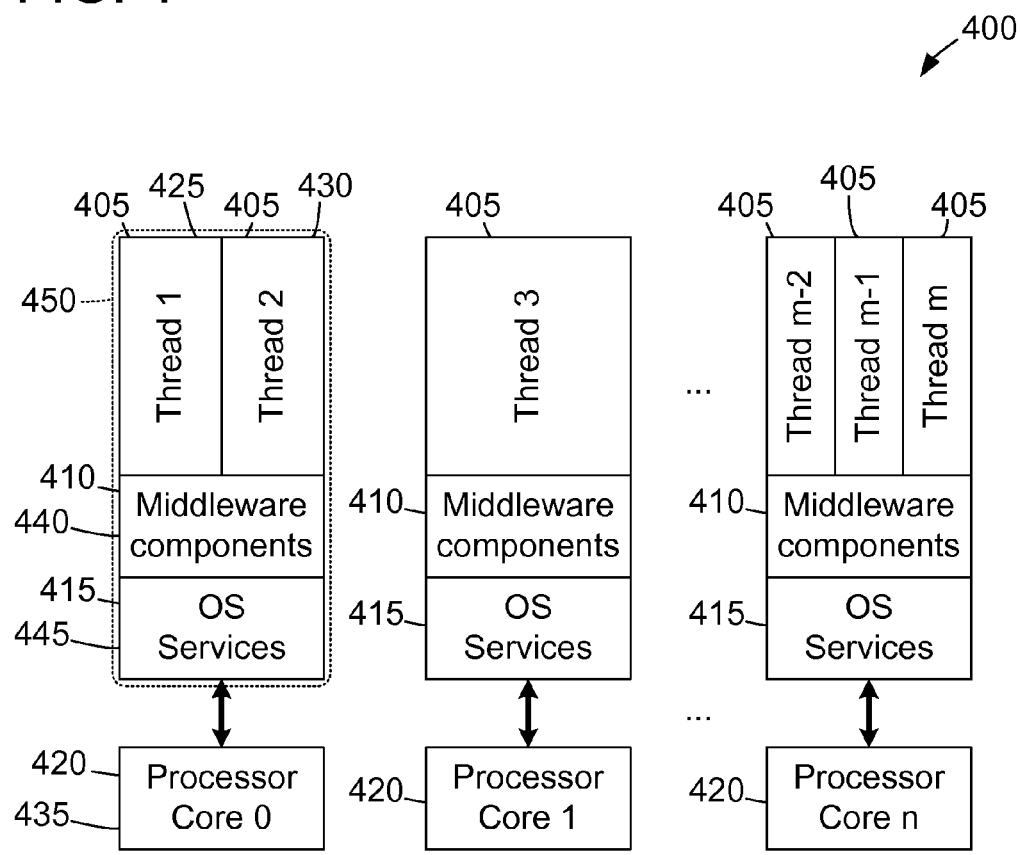
FIG. 4 is an exemplary block diagram of source code and other resources associated with a plurality of processor cores.

FIG. 3 is a flowchart of an exemplary method 300 for use in executing a software application by a processor unit having a plurality of processor cores. All or a portion of method 300 may be performed by one or more computer systems 100, such as, without limitation, server 205 and/or workstation 210 (shown in FIGS. 1 and 2). FIG. 4 is an exemplary block diagram 400 of source code and other resources associated with a plurality of processor cores.

Referring to FIGS. 3 and 4, in the exemplary embodiment, initially, a plurality of threads 405 within source code associated with the software application may be identified 305. For example, threads 405 may be identified 305 by identifying each instantiation of a thread 405 (e.g., "new Thread( )") and/or each execution of an instance of a thread 405 (e.g., "thread1.start( )"). In FIG. 4, the quantity of threads 405 identified 305 is denoted as m to indicate that the methods described herein are operable with any quantity of threads 405.

A portion of the source code that corresponds to each thread 405 is then identified 310. In one embodiment, the source code corresponding to a thread 405 is identified 310 at least in part by identifying 310 a first portion of the source code that is invoked when the thread 405 is executed (e.g., via a start( ) method or similar), and by identifying 310 one or more other portions of the source code that are accessed (e.g., invoked, read, written, or otherwise referenced) by the first portion of the source code.

In the exemplary embodiment, resources accessed by the source code corresponding to the thread 405 are identified 315. Such resources may include, but are not limited to only including, a data structure, a function, a class, a library of executable components, a middleware component 410, and/or an operating system service 415.

Each thread 405 of the plurality of threads 405 is assigned 320 to a processor core 420. For example, workstation 210 may assign 320 threads 405 to processor cores 420 automatically and/or may prompt a user to assign 320 threads 405 to processor cores 420, as described in more detail below with reference to FIGS. 5 and 6. The assignment 320 of threads 405 to processor cores 420 is also referred to as a "thread mapping."

Each processor core 420 is associated 325 with the portions of the source code that correspond to the threads 405 that have been assigned 320 to the processor core 420. The portions of the source code associated 325 with each processor core 420 may be stored 330 in a storage device. In one embodiment, a storage device includes a plurality of locations, and source code portions are stored 330 in a location that is associated with the processor core 420. For example, each processor core 420 may be associated with a directory within a file system that is stored in a storage device, and each source code portion may be stored 330 in a directory corresponding to the processor core 420 associated with the source code portion. The association 325 of source code portions with processor cores 420 may be referred to as a "source code mapping" and/or may be included in the thread mapping.

The source code is operable to transform 335 into object code for execution by the processor core 420. In the exemplary embodiment, the source code portions associated with a processor core 420 are transformed 335 into object code, either alone or in combination with one or more resources accessed by the source code portions. For example, if two portions of source code are associated with a processor core 420, both portions of the source code may be compiled into object code and combined with resources that are required for execution of the object code by the processor core 420 to create 340 an executable package (e.g., a single file including object code) for the processor core 420.

In the exemplary embodiment, source code associated with a first thread 425 and source code associated with a second thread 430 are associated with a first processor core 435. In addition, a set of middleware components 440 that are required (e.g., accessed or invoked) by first thread 425 and/or by second thread 430 are associated with first processor core 435. A set of operating system (OS) services 445 that are required by first thread 425, second thread 430, and/or middleware components 440 are also associated with first processor core 435. In one embodiment, object code that is based on source code associated with first thread 425 and second thread 430, middleware components 440, and/or OS services 445 are operable to be combined to create 340 a single executable package 450 (e.g., an executable file and/or an executable archive). As shown in FIG. 4, any number of threads 405, middleware components 410, and/or OS services 415 may be associated with any quantity of processor cores 420.

Referring again to FIGS. 3 and 4, in some embodiments, the assignments 320 of threads 405 to processor cores 420 and/or the associations 325 of source code portions with processor cores 420 are stored 332 in a storage device. Optionally, a modification to the source code is subsequently received 345. For example, the modification may be received 345 from user 225 (shown in FIG. 2). The modification may affect the quantity of threads 405, the source code portions associated with the threads 405, and/or the resources accessed by the threads 405. Accordingly, in some embodiments, method 300 may be repeatedly performed, as described above. During the subsequent execution of method 300, the mapping that was previously stored 332 is used to assign 320 each thread 405 to a processor core 420 and/or to associate 325 source code portions with processor cores 420.

In one embodiment, a modification to a first portion of the source code is received 345 by workstation 210 and/or by server 205. As indicated by the stored mapping, the first portion was previously associated 325 with first thread 425, and first thread 425 was previously assigned 320 to first processor core 435 that has been associated with a first location within a memory device. Accordingly, the modified source code is stored 330 in the first location. Similarly if the received modification affects source code corresponding to multiple processor cores 420, the modified source code is stored 330 at each location associated with the corresponding processor cores 420.

Figure 5:
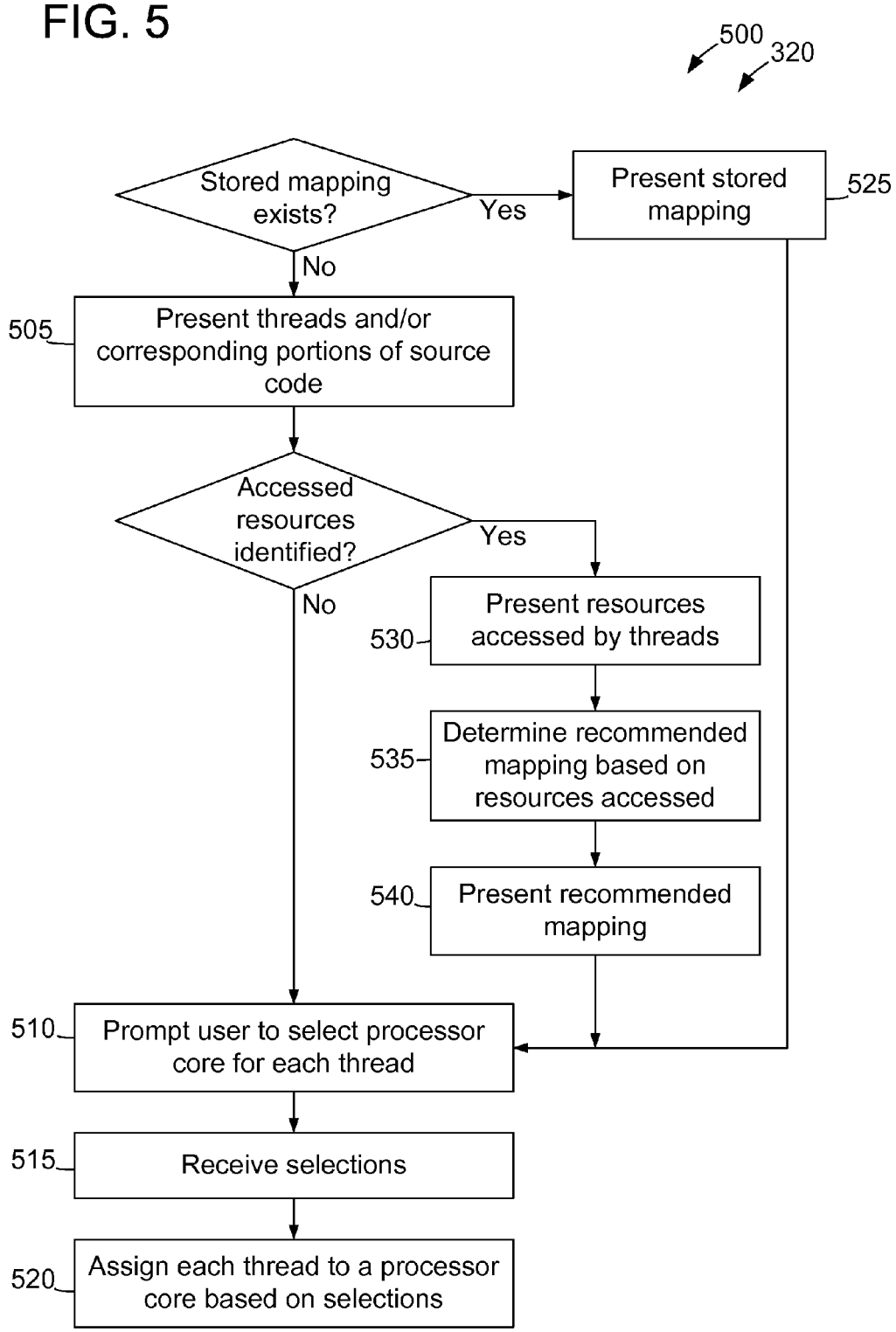
FIG. 5 is a flowchart of an exemplary method for use in assigning threads to processor cores.

FIG. 5 is a flowchart of an exemplary method 500 for use in assigning 320 (shown in FIG. 3) threads 405 to processor cores 420. In one embodiment, no mapping of threads 405 to processor cores 420 has been stored 332 (shown in FIG. 3), and resources accessed by the threads 405 have not been identified 315 (shown in FIG. 3). Identified threads 405 are presented 505 to a user, optionally with corresponding portions of source code. The user is prompted 510 to select a processor core 420 for each thread 405. In such an embodiment, prompting 510 the user to select processor cores 420 for the threads 405 is performed at least in part by displaying a thread mapping user interface to the user, as described in more detail below with reference to FIG. 6. Selections made by the user are received 515, and each thread 405 is assigned 520 to a processor core 420 based on the received selections.

If a mapping of threads 405 to processor cores 420 has previously been stored 332, the stored thread mapping may be presented 525 to the user. In one embodiment, the stored thread mapping is displayed in a thread mapping user interface, enabling the user to confirm or modify the stored thread mapping. For example, a processor core 420 may be pre-selected for each thread 405 in the thread mapping user interface based on the stored thread mapping.

If resources accessed by the threads 405 have been identified 315 (shown in FIG. 3), the resources accessed by each thread 405 may be presented 530. For example, the resources may be displayed as a categorized list, with resources listed by type (e.g., data structure, middleware component, and/or OS service). A recommended mapping may be determined 535 based on the resources accessed by the threads 405 and presented 540 to the user. In one embodiment, determining 535 a recommended mapping includes identifying a group of multiple threads 405 that access an identical or similar set of resources, and assigning this group of threads 405 to a single processor core 420. For example, a first thread and a second thread that access at least one shared software resource may be identified. Based on the sharing of the software resource, the first thread and the second thread may be assigned to a single processor core 420 in the recommended mapping.

Figure 6:
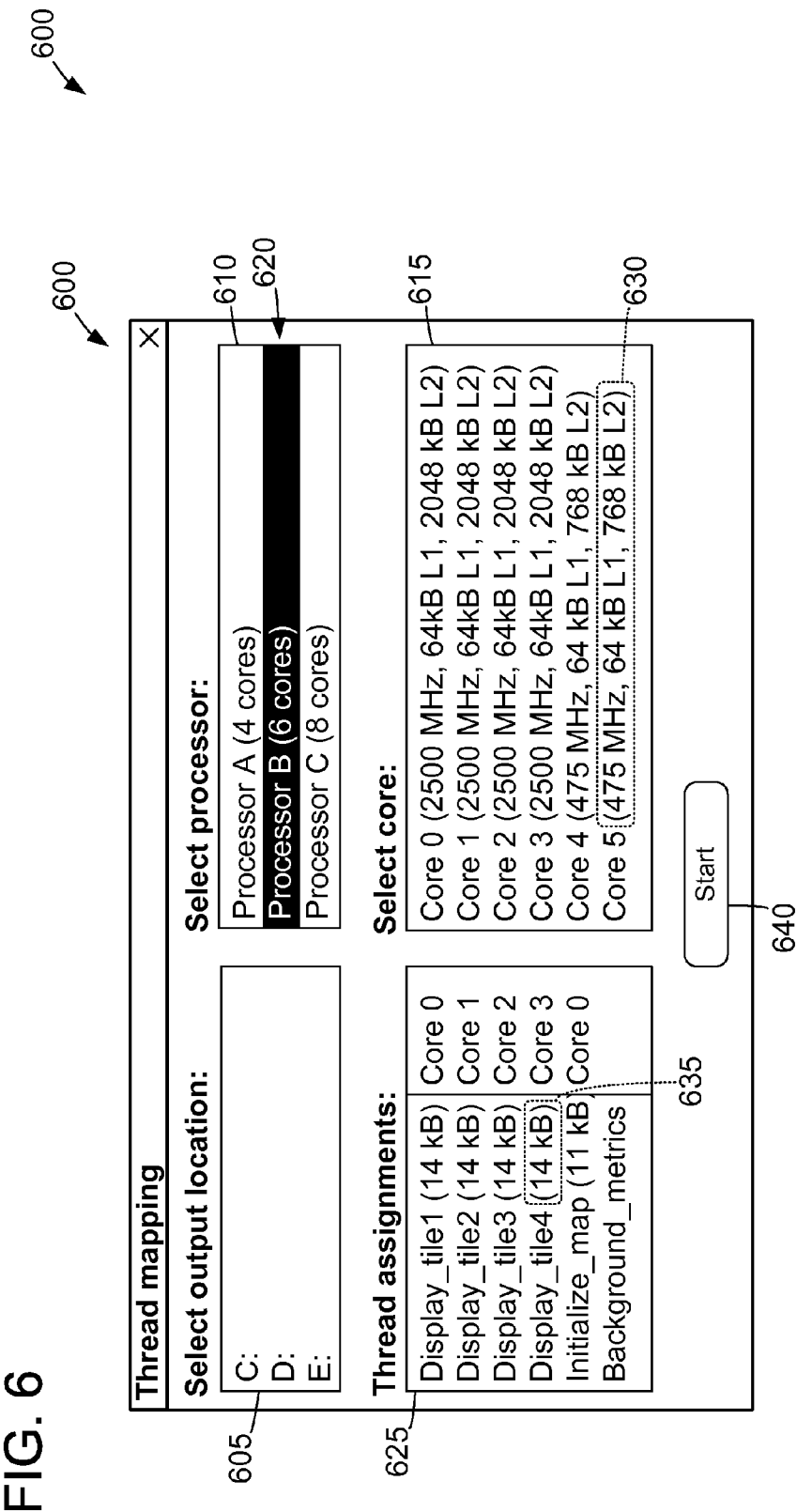
FIG. 6 is an exemplary user interface for assigning threads to processor cores.

FIG. 6 is an exemplary user interface 600 for assigning threads to processor cores. In an exemplary embodiment, user interface 600 is displayed to a user 225 by workstation 210 (both shown in FIG. 2). User interface 600 includes an output location selector 605 and a processor unit selector 610. Output location selector 605 includes a plurality of locations within a storage device. The output location selected within output location selector 605 may be used to store 330 (shown in FIG. 3) source code portions that are associated with processor cores. For example, the location associated with each processor core may be a sub-location (e.g., a sub-directory) of the selected output location.

Processor unit selector 610 includes a list of processor units for which a thread mapping may be defined. For example, a software application may be designed for execution by any one of a plurality of processor units. In some embodiments, a thread mapping and/or a source code mapping may be stored 332 for one or more of the processors listed in processor unit selector 610.

In the exemplary embodiment, user interface 600 also includes a processor core selector 615. In response to user 225 selecting a processor unit 620 within processor selector 610, processor core selector 615 displays a list of processor cores that are included in selected processor unit 620. In the exemplary embodiment, selected processor unit 620 includes six processor cores.

User interface 600 further includes a thread assigner 625. Thread assigner 625 displays a list of threads identified 305 (shown in FIG. 3) in source code associated with a software application. For each thread, user 225 may select a processor core in processor core selector 615, thereby assigning the thread to the selected processor core. In some embodiments, thread assignments displayed in thread assigner 625 are pre-populated based on a previously stored thread mapping and/or an automatically determined recommended thread mapping.

In some embodiments, processor core selector 615 includes one or more processor core attributes 630 (e.g., an instruction set architecture, a processing speed, and/or a cache size) for each processor core. Displaying processor core attributes 630 enables a user 225 to select a processor core that is appropriate for each thread. For example, a thread known by the user 225 to perform a high proportion of floating point calculations may be assigned to a processor core having an instruction set architecture (ISA) that exhibits high floating point performance. In one embodiment, thread assigner 625 includes one or more thread attributes 635 (e.g., a size of the thread in executable form). A user 225 may assign threads to processor cores based on the sizes of the threads and the cache sizes of the processor cores. In one embodiment, the threads assigned to a processor core have a combined size that is less than the processor core's cache size. Such an embodiment facilitates executing the threads assigned to a processor core within the cache of the processor core and reducing or eliminating accesses to main memory during execution.

User interface 600 also includes a start button 640. In the exemplary embodiment, in response to user 225 selecting start button 640, workstation 210 associated 325 source code portions corresponding to each thread with the processor core to which the thread is assigned and/or stores 330 the source code portions in locations associated with the processor cores.

Figure 7:
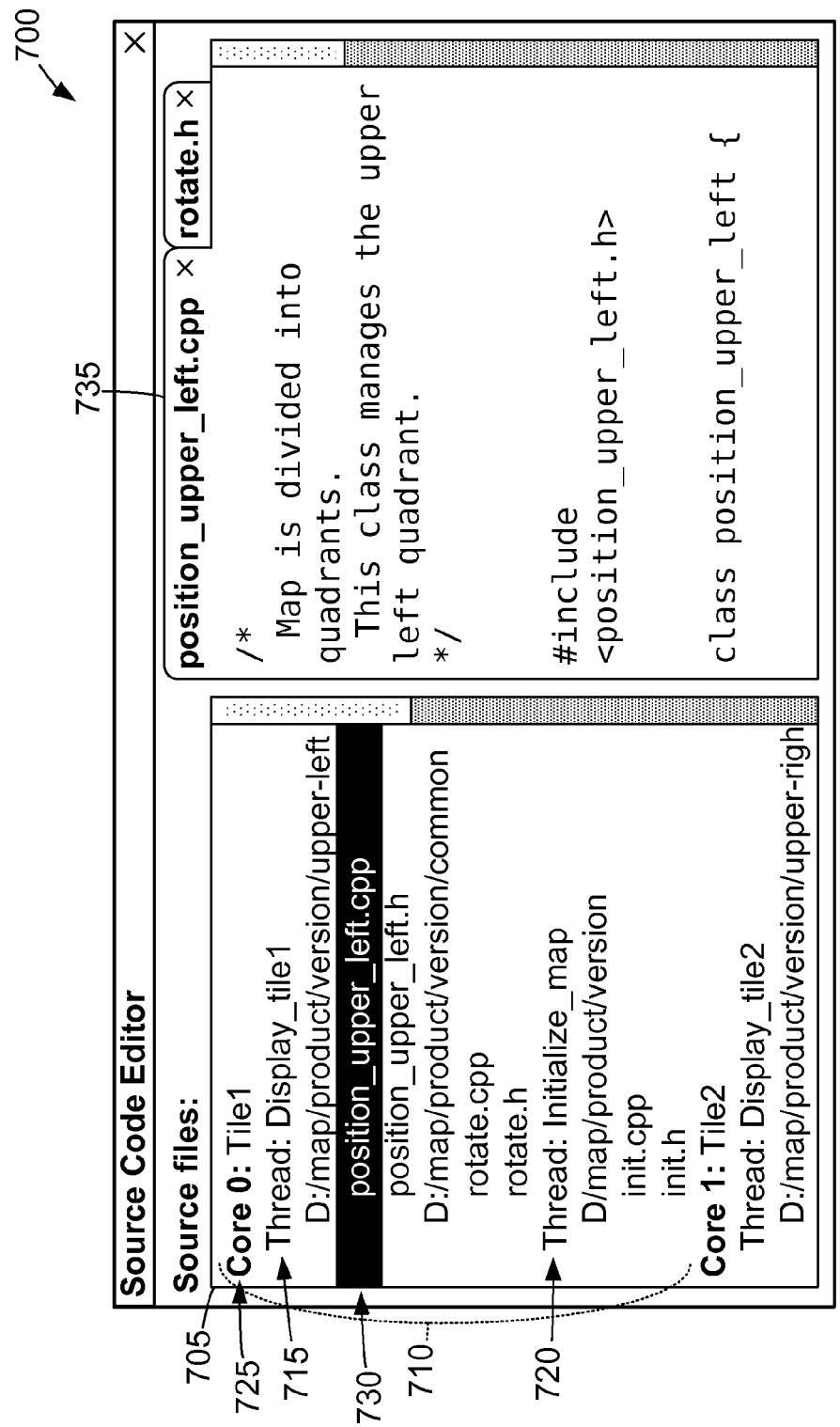
FIG. 7 is an exemplary user interface for displaying portions of source code that correspond to identified threads.

FIG. 7 is an exemplary user interface 700 for displaying portions of source code that correspond to identified threads. User interface 700 includes a source code navigator 705, which displays processor cores, threads, and/or the names of directories and/or files that include source code associated with a software application. In the exemplary embodiment, source code navigator 705 displays a first processor core section 710. A first thread 715, "Display_tile1", and a second thread 720, "Initialize_map", are assigned to a first processor core 725, "Core 0". Source code is included in one or more directories and/or files that are associated with first thread 715 and second thread 720.

Source code navigator 705 displays the relationships between processor cores, threads, and source code. In the exemplary embodiment, source code navigator 705 displays each thread below and indented relative to the processor core to which the thread is assigned. Similarly, each directory containing source code is displayed below and indented relative to the thread with which the directory is associated, and each file is displayed below and indented relative to the directory including the file.

User interface 700 enables user 225 (shown in FIG. 2) to view and/or edit source code. In the exemplary embodiment, in response to user 225 selecting a file 730 displayed in source code navigator 705, user interface 700 displays a source code editor 735 including the portion of the source code corresponding to (e.g., included in) selected file 730.

Further, user interface 700 may enable user 225 to modify selected file 730 and save such modifications. In one embodiment, modifications to selected file 730 are stored in a primary copy of selected file 730, and the modified primary copy is stored 330 (shown in FIG. 3) in one or more locations based on a previously defined thread mapping and/or source code mapping.

Embodiments described herein enable a user to define a persistent mapping of software application threads to processor cores of one or more processor units. Based on the thread mapping, portions of the source code associated with each thread may be stored in (e.g., copied to) a location associated with the processor core to which the thread is assigned. An executable package may be created for each processor core by generating object code from the source code associated with the processor core and combining the object code with any resources required by the object code. Further, the mapping may be stored for subsequent use, such that the user need not manually assign threads to processor cores more than once. In addition, embodiments described herein enable a user to view directories and/or files containing source code based on the defined mapping.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in executing a software application by a processor unit that includes a plurality of processor cores, said method comprising:
    identifying, by a computer system, a plurality of threads within source code associated with the software application;
    identifying, by the computer system, a portion of the source code that corresponds to each thread of the plurality of threads;
    assigning each thread of the plurality of threads to a processor core of the plurality of processor cores;
    storing the assignments of threads to processor cores in a storage device, and portions of the source code associated with each processor core in a location of the storage device that is associated with the processor core;
    associating, by the computer system, each processor core with the portions of the source code that correspond to the threads assigned to the processor core, wherein the portions of the source code associated with each processor core are operable to be transformed into object code for execution by the processor core;
    receiving a modification to a first portion of the source code that is associated with a first thread of the plurality of threads, wherein the first thread is assigned to a first processor core of the plurality of processor cores; and
    updating the first portion of the source code at a first location that is associated with the first processor core based on the stored assignments.

2. A method in accordance with claim 1, wherein identifying a portion of the source code that corresponds to each thread of the plurality of threads comprises:
    identifying a first portion of the source code that is invoked when the thread is executed, and
    identifying a second portion of the source code that is accessed by the first portion of the source code.

3. A method in accordance with claim 1, wherein assigning each thread of the plurality of threads to a processor core comprises prompting a user to select a processor core for each thread of the plurality of threads.

4. A method in accordance with claim 1, further comprising:
    identifying a first thread and a second thread of the plurality of threads that access at least one shared software resource, wherein the shared software resource includes at least one of a data structure, a function, a middleware component, and an operating system service; and
    assigning the first thread and the second thread to a single processor core based on the shared software resource.

5. A system for use in executing a software application by a plurality of processor cores, said system comprising:
    a storage device configured to store source code associated with the software application, wherein the source code defines a plurality of threads;
    a processor unit coupled to said storage device and programmed to:
    identify a portion of the source code corresponding to each thread of the plurality of threads;
    assign each thread of the plurality of threads to one processor core of the plurality of processor cores;
    store the assignments of threads to processor cores in a storage device, and portions of the source code associated with each processor core in a location of the storage device that is associated with the processor core;
    associate each processor core of the plurality of processor cores with the portions of the source code that correspond to the threads assigned to the processor core, wherein the portions of the source code associated with the processor core are operable to be transformed into object code for execution by the processor core;
    receive a modification to a first portion of the source code that is associated with a first thread of the plurality of threads, wherein the first thread is assigned to a first processor core of the plurality of processor cores; and
    update the first portion of the source code at a first location that is associated with the first processor core based on the stored assignments.

6. A system in accordance with claim 5, wherein said storage device is further configured to store one or more processor core attributes describing each processor core of the plurality of processor cores, wherein the one or more attributes include at least one of an instruction set architecture, a processing speed, and a cache size.

7. A system in accordance with claim 6, further comprising a presentation interface coupled to said processor unit and configured to present the processor core attributes, wherein the processor unit is further programmed to prompt a user to select a processor core of the plurality of processor cores for each thread of the plurality of threads.

8. A system in accordance with claim 5, further comprising a presentation interface coupled to said processor unit and configured to:
    present the plurality of threads; and
    present the portion of the source code that corresponds to a first thread of the plurality of threads.

9. A system in accordance with claim 8, further comprising an input/output unit coupled to said processor unit and configured to receive a selection of the first thread, wherein said presentation interface is configured to present the portions of the source code that correspond to the first thread based on the received selection.

10. A system in accordance with claim 5, further comprising a presentation interface coupled to said processor unit and configured to:
  present the plurality of processor cores; and
  present the portions of the source code that are associated with a first processor core of the plurality of processor cores.

11. A system in accordance with claim 10, further comprising an input/output unit coupled to said processor unit and configured to receive a selection of the first processor core, wherein said presentation interface is configured to present the portions of the source code that are associated with the first processor core based on the received selection.

12. A system in accordance with claim 5, wherein said processor unit is further programmed to transform the portions of the source code associated with each processor core into object code for execution by the processor core.

13. A system in accordance with claim 5, wherein said storage device is further configured to store a thread mapping, wherein the thread mapping indicates the threads that are assigned to each processor core of the plurality of processor cores.

14. A system in accordance with claim 13, wherein after an update to the source code creates updated source code, said processor unit is further programmed to:
  identify a portion of the updated source code corresponding to each thread of the plurality of threads;
  associate each processor core of the plurality of processor cores with the portions of the updated source code that correspond to the threads assigned to the processor core in the stored thread mapping.

15. A system in accordance with claim 5, wherein said storage device is further configured to store a source code mapping for each processor core of the plurality of processor cores, wherein the source code mapping indicates the portions of the source code that are associated with the processor core.

16. A system in accordance with claim 5, wherein said processor unit is further programmed to identify the plurality of threads defined by the source code.

17. One or more non-transitory computer readable media having computer-executable components, said components comprising:

a parsing component that when executed by at least one processor unit causes the at least one processor unit to:
  identify a plurality of threads within source code associated with a software application; and
  identify a portion of the source code that corresponds to each thread of the plurality of threads; and
a mapping component that when executed by at least one processor unit causes the at least one processor unit to:
assign each thread of the plurality of threads to a processor core of a plurality of processor cores;
store the assignments of threads to processor cores in a storage device, and portions of the source code associated with each processor core in a location of the storage device that is associated with the processor core;
associate each processor core of the plurality of processor cores with the portions of the source code that correspond to the threads assigned to the processor core, wherein the portions of the source code are operable to be transformed into object code for execution by the processor core;
receive a modification to a first portion of the source code that is associated with a first thread of the plurality of threads, wherein the first thread is assigned to a first processor core of the plurality of processor cores; and
update the first portion of the source code at a first location that is associated with the first processor core based on the stored assignments.

18. One or more non-transitory computer readable media in accordance with claim 17, wherein the mapping component, when executed by the at least one processor unit, further causes the at least one processor unit to create a copy of the portions of source code associated with each processor core of the plurality of processor cores in a storage device location that is associated with the processor core.

19. One or more non-transitory computer readable media in accordance with claim 17, further comprising a packaging component that when executed by the at least one processor unit, causes the at least one processor unit to:
  transform the portions of the source code associated with each processor core into object code associated with the processor core; and
  combining the object code associated with each processor core and one or more resources required by the object code to create an executable package for execution by the processor core.

* * * * *